United States Patent [19]

Jones

[11] 4,125,800
[45] Nov. 14, 1978

[54] POWER CONTROLLER WITH A MODULAR POWER OUTPUT

[75] Inventor: Donald H. Jones, Pittsburgh, Pa.

[73] Assignee: Contraves Gorez Corporation, Pittsburgh, Pa.

[21] Appl. No.: 609,901

[22] Filed: Sep. 2, 1975

[51] Int. Cl.² ............................................. G05F 1/08
[52] U.S. Cl. .................................. 318/681; 318/677; 318/341; 361/386
[58] Field of Search .................. 317/99, 100; 318/677, 318/681; 361/415, 424, 386

[56] References Cited

U.S. PATENT DOCUMENTS

| | | | |
|---|---|---|---|
| 3,254,302 | 5/1966 | Boykin et al. | 307/58 |
| 3,720,900 | 3/1973 | von Brüning | 338/25 |
| 3,859,570 | 1/1975 | Veranth et al. | 317/100 |
| 3,909,679 | 9/1975 | Petri | 317/100 |
| 3,942,586 | 3/1976 | Fries | 317/100 |

FOREIGN PATENT DOCUMENTS

| | | | |
|---|---|---|---|
| 1,232,222 | 1/1967 | Fed. Rep. of Germany | 317/99 |
| 1,263,886 | 3/1968 | Fed. Rep. of Germany | 317/99 |
| 1,488,094 | 1/1969 | Fed. Rep. of Germany | 363/65 |
| 1,913,135 | 10/1969 | Fed. Rep. of Germany | 317/100 |

OTHER PUBLICATIONS

King, "Test Report: BGN Systems Model 500D Basic Power Amplifier" Audio 12/75, pp. 76–79.
King, "Power FET's" Audio, 2/75, pp. 42–50.
Millman et al., *Integrated Electronics: Analog and Digital Circuits and Systems* 1972, pp. 302–303.
GE Transistor Manual 1969, pp. 222–223.
Wachner et al., "FTC Power Ratings: An Optimistic View," Audio 2/75, pp. 22–28.
Tucker, "An Alternative View" Audio 2/75, pp. 30–32.

Primary Examiner—Robert K. Schaefer
Assistant Examiner—Eugene S. Indyk
Attorney, Agent, or Firm—Robert D. Yeager

[57] ABSTRACT

A power controller having a plurality of power output modules which can be added or removed as desired to change the power output rating. The electrical output of the individual power modules are removably attached to an output combining structure. The electrical connections to the output combining structure also provide mechanical support for the power output modules. The servo controller is constructed so that as additional power modules are added, each provides a predetermined proportion of the output power. That is, each module will add in a linear fashion to the total output capability of the amplifier. Load sharing among the modules is provided. An etched copper resistor having a positive resistance versus temperature characteristic is provided to aid load sharing among the output semiconductors. A feedback signal is derived from the power output modules to protect the servo controller. The protection of the power controller is one function of the feedback signal, in that, it limits the maximum current derivable from the controller under normal conditions. The primary function of the current feedback signal is to provide an error signal which when combined with the input command causes the current output to be properly metered to a load. The feedback signal can be obtained from only one of the output modules since load sharing is provided or can be obtained in several or all of the power output modules as desired. Temperature sensing of a representative module is provided for system protection.

53 Claims, 16 Drawing Figures

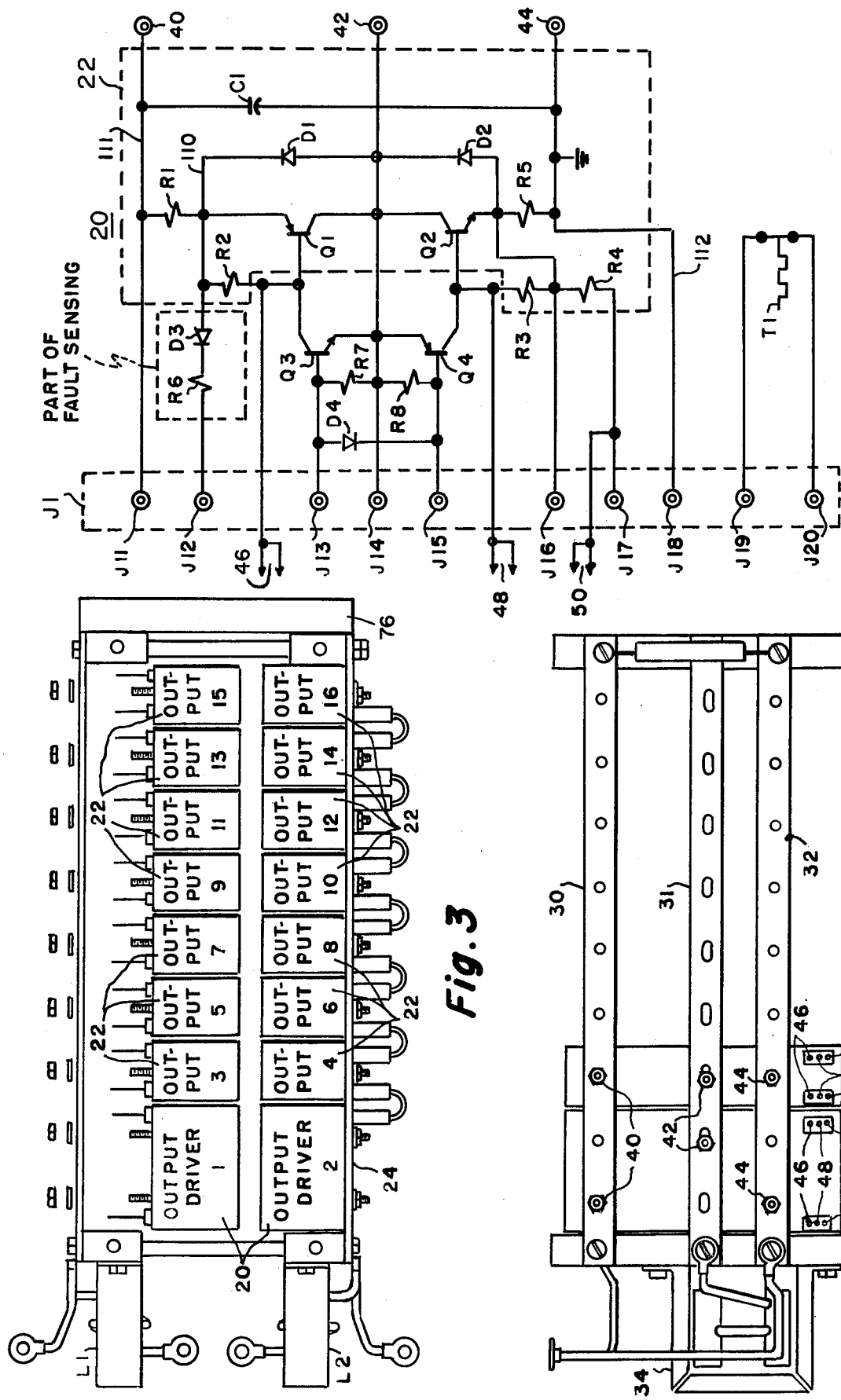

CURRENT FEED-BACK CIRCUITS

CONTROL CIRCUITS

POWER CONTROLLER WITH A MODULAR POWER OUTPUT

BACKGROUND OF THE INVENTION

1. Field of the Invention

This invention is related to a power processing system and more particularly to a power controller wherein the power output capacity can be varied by adding or removing individual power output modules.

2. Description of the Prior Art

Prior art servo controllers, power amplifiers, and power regulators are normally designed to provide a given output capacity. Once constructed it is difficult, if not impossible, to increase the output rating of prior art devices without major disassembly or redesign.

In some prior art power controllers, it is necessary to have a feedback signal related to current to provide adequate protection and control of the device. Some prior art devices have output sections configured as a bridge in which the current feedback signal is derived from a shunt disposed in series with the load at the bridge output. This generally provides a signal having poor form factor with little usable information because of the presence of high common-mode voltages at the shunt. It has been discovered and recognized that by placing two sampling resistors, one in each leg of the bridge circuit at the common connection point, a superior current feedback signal can be derived using a differential amplifier.

SUMMARY OF THE INVENTION

A power controller is provided wherein the power output capacity of the controller can be varied, in increments, by adding modules as required to meet the load. The disclosed controller utilizes identical power modules which can be easily attached or removed. Each module contains power semiconductors for supplying controlled amounts of output current at a rated voltage. Additional power modules can be attached to a common mechanical and electrical structure so that the addition of each module will add in a linear fashion to the total output capability of the power processor. That is, each module supplies a proportional amount of the total output current. Each module is constructed to assure that the sharing of the load is within certain limits, such as 10%. When the term servo controller, power controller, power regulator, power amplifier or power processor is used herein, it is intended to be inclusive of the other designated terms.

Current feedback is provided for control and protection of the disclosed power processor. With the positive load sharing provided, it is feasible to provide a current feedback signal from only one module, knowing the other modules cannot vary from this amount by more than a predetermined amount. This current feedback signal represents, within the limits of load sharing, current in any of the other modules not sampled. Hence, with proper scaling, a signal representative of total load current can be derived from the signal obtained from the sample module. In addition, the temperature of the sample module from which the feedback signal is derived can also be utilized for over temperature monitoring.

In another embodiment of the invention, the current feedback signal can be derived from a composite signal of the current in all of the power modules. Each power module can be provided with a sampling resistor, the output of which is combined to form a composite current feedback signal.

In another embodiment, the output of the power controller is connected in a bridge configuration. Individual power modules are utilized for forming each side of the bridge. Thus, each side of the bridge can be formed from a plurality of power output modules. Power output modules on each side of the bridge are constructed to provide for load sharing.

It is an object of this invention to teach a power processor constructed to accommodate a plurality of power output modules which can be easily added or removed to vary the output capacity.

It is another object of this invention to teach a power controller having a plurality of power output modules wherein load sharing among the modules is present and a feedback signal representative of current flowing through each module is derived from only one of the modules.

It is yet another object of this invention to teach a power controller having a plurality of output modules wherein an etched copper resistor having a positive temperature coefficient is utilized in each module to enhance load sharing.

BRIEF DESCRIPTION OF THE DRAWINGS

For a better understanding of the invention, reference may be had to the preferred embodiments exemplary of the invention shown in the accompanying drawings in which:

FIG. 3 is a top view of a portion of the power output section of a servo controller, connected in a bridge configuration, showing the power modules;

FIG. 4 is a side view of a portion of the power output section shown in FIG. 3;

FIG. 5 is a circuit schematic of the first output power module which also includes the driver circuit for the other output power modules;

DESCRIPTION OF THE PREFERRED EMBODIMENT

Figure 1:
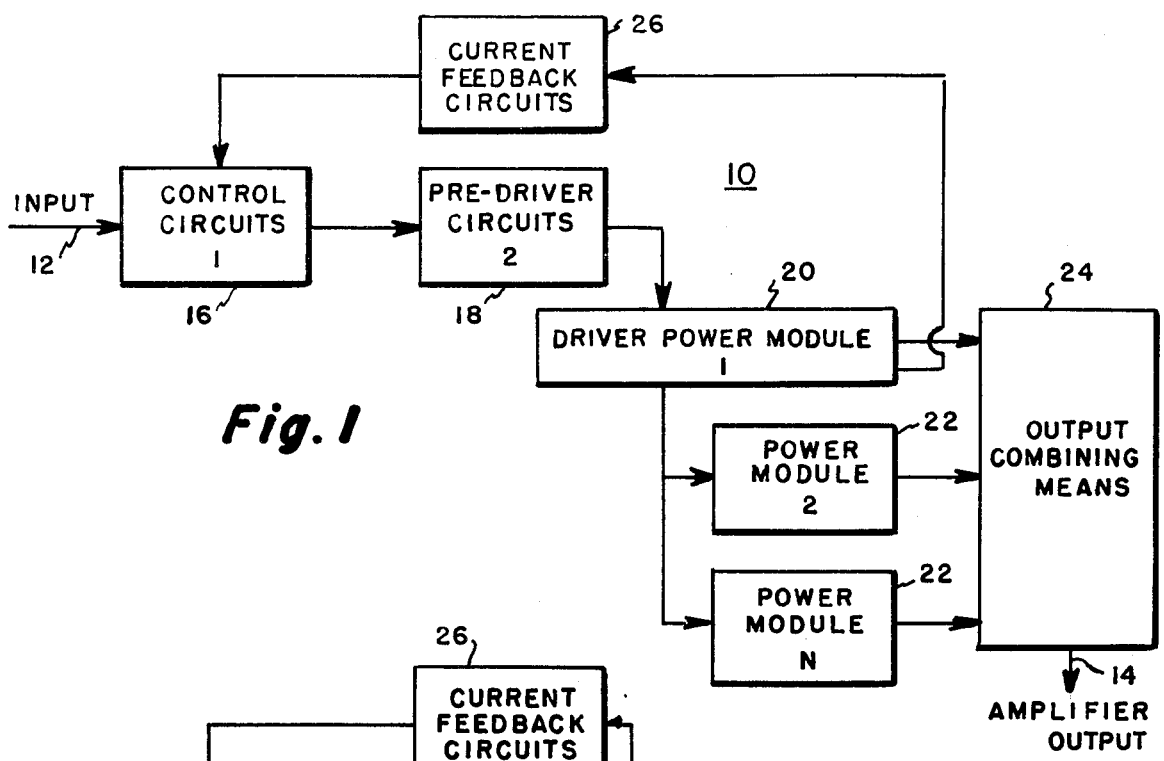
FIG. 1 is a block diagram of a servo controller utilizing the teaching of the present invention showing a current feedback signal derived from one module.

Referring now to the drawings and FIG. 1 in particular, there is shown a servo controller utilizing the teachings of the present invention. Servo controller 10 is provided with an input 12 and an output 14 which can feed various loads. Input 12 is connected to control circuit 16 which feeds predriver circuits 18. The output of predriver circuits 18 feeds a driver and power module 20. Driver and power module 20 provides the driver signal to drive additional modules 22 when required. The output of the driver and power module 20 and the connected power modules 22 are combined by output combining means 24. Output combining means 24 provides mechanical support for the output and driver module 20 and the power output modules 22 through the electrical connections to the associated modules. Each module 20 or 22 is constructed to provide a proportional share of the power output of servo controller 10. A current feedback signal is provided by current feedback circuits 26 to control operation of servo controller 10. The feedback signal through current feedback circuits 26 is derived only from the power output and driver module 20. Since load sharing among various modules 20 or 22 is provided, the feedback signal through current feedback circuits 26 is representative of the current flow through the other power modules within the limits of the load sharing. The temperature rise of driver module 20 can be monitored and used for protection of associated apparatus and this should also be representative of the maximum temperature of other modules 22. By virtue of the sharing circuits in modules 20 or 22, it is known that current in any other module cannot vary by more than 10% from the proportional share. The capacity of servo controller circuit 10 can be increased by adding additional power modules 22 as desired. By sampling feedback current from only one module 20, circuit simplification is obtained.

Figure 2:
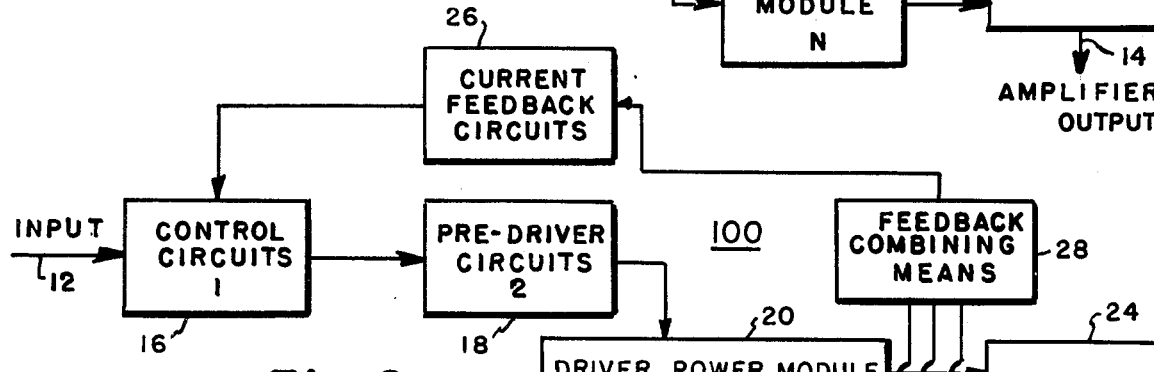
FIG. 2 is a block diagram of a servo controller utilizing another embodiment of the present invention wherein a current feedback signal is derived from each module.

Referring now to FIG. 2, there is shown another servo controller circuit 100 utilizing a different embodiment of the present invention. Servo controller 100 is provided with control circuit 16, current feedback circuits 26, predriver circuits 18, output and driver modules 20, output modules 22, and output combining means 24 as described above. Servo controller 100 additionally includes a feedback combining means which samples a current feedback signal from each module 20 or 22. Feedback combining means 28 can form either a composite feedback signal of all the current outputs or can provide a signal representative of the highest current supplied by any module 20 or 22. Power modules 22 can be added or subtracted to vary the output capacity of servo controller 100. The output combining means also provides a common mechanical structure for supporting the various modules 20 or 22. The output of each module 20 or 22 is combined by the output combining means in an output summation which yields a composite output which is generally referred to as the amplifier output. The feedback signal can include both voltage and current and other parameters which may be important for various amplifier constructions.

Referring now to FIGS. 3 and 4, there is shown the output combining means 24 and a plurality of modules 20 or 22 mounted thereto. As can be seen best in FIG. 4, output combining means 24 includes spaced apart conducting rails 30, 31 and 32 to which the electrical output connection of modules 20 or 22 are attached. These electrically conducting rails 30, 31 and 32 also provide mechanical support for the modules 20 or 22. Driver module 20 includes a driver portion and a power module portion which is similar to that contained in power module 22. The output of combining means 24 is fed through inductors L1 or L2 which limit the rate of change of output current to provide some system protection.

Figure 6:
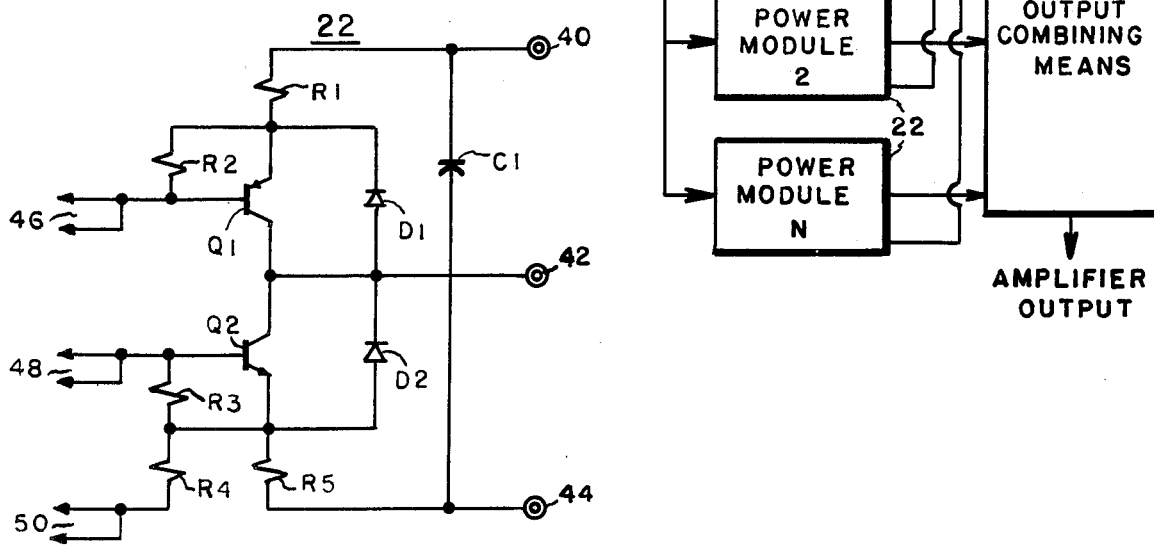
FIG. 6 is a schematic of a power output module without the driver circuit.

Referring now to FIG. 6, there is shown a power output module 22. Power output module 22 includes a PNP transistor Q1 and an NPN transistor Q2 which are complementary power transistors that act as power switches conducting a proportional share of the total controller 10 output current. Resistors R1 and R5 are emitter resistors that act to force the transistors Q1 and Q2 to conduct a proportional amount of the output current. That is, when a plurality of power output modules 22 are connected in parallel, resistors R1 and R5 assure that current sharing among the various output modules will be fairly even. The value of R1 and R5 are selected to assure that the load sharing among the various modules will be within 10%. Resistor R1 is an etched copper resistor formed integral with the printed circuit boards on which the components are mounted. Resistor R1 has a positive temperature coefficient which enhances load sharing. R2 and R3 are base-emitter resistors that act to bypass leakage current around the associated transistor in such a manner as to prevent false conduction or premature voltage breakdown. Resistors R2 and R3 are especially important at elevated operating temperatures. Diodes D1 and D2 are freewheeling diodes that act to conduct inductive load currents during periods of time when Q1 and Q2 are turned off. That is, when load current is flowing through either transistor Q1 or Q2 and they are switched off, inductance in the circuit will prevent the current from instantaneously being driven to zero and to prevent damage to the circuit, it will be shunted through one of the free-wheeling diodes D1 or D2. R4 is part of a composite current limiting resistor for the predriver transistors Q26 or Q37 shown in FIG. 8B. Resistor R4 acts in effective parallel with other similar resistors in other parallel modules 22 to limit current from predriver transistors Q26 or Q37 to a safe value. Terminal 40 is provided for making a positive connection to a positive voltage bus 30 or line 111. Terminal 42 is provided for making a connection to the output bus 31 of combining means 24, from which the load connections are taken. Terminal 44 is provided for making a connection to the common circuit bus 32 or line 112. Each power module is provided with three input connections 46, 48 and 50. Each input connection 46, 48 or 50 is provided with two connection points for easy connection to adjacent modules. A driver signal can be provided on connectors 46 and 48 for transistors Q1 or Q2, respectively. Connector 50 completes a circuit to resistor R4 which limits current from driver transistors Q37 or Q26, when used in a bridge connection as shown in FIG. 8B. Capacitor C1 is an integral capacitor that acts to smooth the voltage on the DC bus at each module.

Referring now to FIG. 5, there is shown a circuit for a combined power output and driver module 20. Power and driver module 20 includes a power output circuit 22 as shown in FIG. 6 and described in detail above. Power output and driver module 20 also includes a temperature sensing portion, a driver portion, and a fault sensing portion. Transistors Q3 and Q4 are NPN/PNP complementary transistors acting as driver transistors for transistors Q1 and Q2 of the integral output circuit 22 and any other connected power module circuits 22. Resistors R7 and R8 are base-emitter resistors associated with transistors Q3 and Q4, respectively, for conducting leakage current around the associated devices. Resistors R3 and R4 prevent false conduction and premature voltage breakdown, especially at elevated device temperatures. Diode D4 is a fast recovery-type diode that acts to prevent the conduction of transistor Q3 when transistor Q4 is conducting, and conversely to prevent transistor Q4 from conducting when transistor Q3 is conducting. Output connections 46, 48 and 50 are provided, each having two terminals to facilitate connection to adjacent modules 20 or 22. Driver transistors Q3 and Q4 drive all transistors Q1 and Q2 in the parallel output modules which are connected. A temperature sensing switch T1 is provided on circuit 20 in proximity to the primary temperature generating elements which are transistors Q1, Q2, Q3 and Q4. Thermal switch T1 is part of the output driver module and acts to monitor the temperature of this module. When temperature switch T1 operates, the associated power processor is disabled. Power and driver module 20 is provided with a ten terminal connector J1 having output terminal connections J11 through J20. J19 and J20 provide connections to thermal switch T1. J11 provides a connection to the positive bus from the printed circuit board. J12 provides a connection to the overvoltage protection portion of module 20. J13, J15 and J17 provide connections to module 20 from the predriver circuit. Connectors J16 and J18 provide connections for the current feedback signal.

In FIG. 8B, resistor R134 provides current limiting for predriver transistor Q30 and resistor R112 provides current limiting for predriver transistor Q19. Resistor R4, rather than using a current limiting resistor such as R134 or R112, is placed in each module 20 or 22 to limit the current through predriver transistor Q26 or Q37. Resistor R4 also functions to evenly distribute the current from the predriver transistor Q26 or Q37 to each module 20 or 22 through each modules sensing resistor R5. An alternate to this construction would be to use a resistor such as R134 connected to the collector of transistor Q37 and also tie the emitter of transistor Q37 to the common line 112. This could by-pass a substantial amount of current around current sampling resistor R5. With the addition of R4, the current which flowed through transistor Q37 is limited and all current flowing through Q37 proportionately flows through each sampling resistor R5.

Driver module circuit 20 is also provided with a fault sensing portion consisting of diode D3 and resistor R6. As current flows through resistor R1, line 110 becomes negative with respect to positive line 111, due to the current flow through resistor R1. Current flows through network D3 and R6. When this becomes sufficient, due to the current flow through R1, an over current fault circuit located on the controller main printed circuit board is activated. This circuit acts to disable the servo controller when the current flow exceeds a predetermined overload value. R6 is also used to combine the signal sensed from R1 with similar signals from the output driver module connected on the opposite side of the bridge. Diode D3 acts to compensate for temperature caused changes in the resistance of R1 which is an etched foil resistor.

Resistor R1, which is formed from copper, has a positive temperature coefficient which improves current sharing module to module. The concept of readily removable power output modules requires good load sharing to be viable. A load sharing resistor having a positive temperature coefficient provides a means for reducing the power output of each module should the ambient temperature increase or the cooling air flow decrease. The load sharing resistor R1 is formed directly on the PC-board and placed in the air flow close to the semiconductors being controlled. The etched copper resistor R1 regulates current flow through the associated module, 20 or 22, as a function of temperature.

The beneficial aspects of the etched copper resistor can best be understood by considering the following analysis. The bases of all the transistors, Q1 or Q2, through which load sharing is desired are tied together. Thus, the voltage, V base, on each base is the same. Considering a constant potential applied to each base, the following equation defines the approximate behavior of the transistor, Q1 or Q2.

$$(V_B - V_{BE}/R) = 0\ I_L + I_B \qquad (1)$$

where,
$V_{BE}$ is the base to emitter voltage
$V_B$ is the base voltage
$I_L$ is the load current
$I_B$ is base current Since $(I_L/I_B) = H_{FE}$ of the transistor, equation (1) can be rewritten as $$\frac{V_B - V_{BE}}{R} = I_L + \frac{I_L}{H_{FE}} \qquad (2)$$

or $$I_L = \frac{V_B - V_{BE}}{R(1 + \frac{1}{H_{FE}}0)} \qquad (3)$$

Since $H_{FE}$ is usually greater than 10, and more typically 15 or 20, the contribution of $1/H_{FE}$ is relatively small, and $I_L$ can be approximated as $$I_L \simeq (V_B - V_{BE}/R) \qquad (4)$$

The temperature rise of resistor R1 is related to the amount of power it dissipates. Since the actual load current and transistor base current pass through the resistor R1, the dissipated power $P_{R1}$ can be expressed as $$P_{R1} = I_L^2 (1 + \frac{1}{H_{FE}})^2 R \qquad (5)$$

or for $H_{FE} = 10$
$$P_{R1} = I_L^2 (1.1)^2 R = 1.21\ I_{load}^2 R \qquad (6)$$

By differentiating equation (3) with respect to R, the rate of change in load current, $I_L$, as a function of change in R can be determined.

$$\frac{dI_L}{dR} = \left[ \frac{V_B - V_{BE}}{1 + \frac{1}{H_{FE}}} \right] [R^{-2}][-1] =$$

$$7 - \left[ \frac{V_B - V_{BE}}{1 + \frac{1}{H_{FE}}} \right] \left[ \frac{1}{R^2} \right]$$

or $$dI_L = [-I_L][(1/R)\ dR\ 8$$

since
$$dI_L \simeq \epsilon I, \text{ and}$$

$$dR \simeq \Delta R$$

$$\frac{\Delta I_L}{I_L} = -\frac{\Delta R}{R} \quad (9)$$

Thus the load current will change by a ratio that is equal to the ratio change in the resistance, R.

The temperature $T_R$ of the resistor, R, can be expressed as $$T_R = f(I_L^2, \text{ air flow, ambient temperature}) \quad (10)$$
or
$$\Delta T_R = (2)\frac{\delta T_R}{\delta I_L}(\Delta I_L) + \frac{\delta T_R}{\delta \text{ air flow}}(\Delta \text{ air flow}) + \frac{2 T_R}{2 \text{ ambient temperature}}(\Delta \text{ ambient temperature}) \quad (11)$$

Note that due to the squared term, of $I_L$, the temperature of the resistor is greatly affected by variations in $I_L$. If the material utilized in the construction of resistor, R, possesses a positive temperature coefficient, such as copper, steel or the like, the change in resistance as a function of temperature can be expressed as $$\Delta R/R = K \Delta T \quad (12)$$

In the case of copper, which can be directly formed on the printed circuit board, by well known photographic etching techniques, the change in resistance as a function of temperature can be expressed as $$\Delta R/R = K_1 \Delta T \quad (13)$$

where $K_1 \simeq 0.00393$

T is temperature in degrees celsius The use of a positive temperature coefficient material for resistor R1 provides improved regulation of the load current through a given transistor. If the ambient temperature increases, R1 also increases in value reducing $I_L$. This provides improved load sharing. Furthermore, since most power amplifying devices employ forced air cooling, the resistor, R1, can also be cooled by this same air flow. Should the air flow be reduced, due to low voltage, dirty filters, or the like, the control resistor, R1, will increase in value and reduce the current from the amplifier to a safe level. Load sharing resistors, R1 and R5, also provide for load sharing among the paralleled diodes D1 and D2. With inductive loads when transsitor Q1 or Q2 shuts off, current will momentarily continue to flow through the appropriate diode D1 or D2. By virtue of load sharing, each parallel diode D1 or D2 carries a proportional amount of current. If there was not load sharing among the diodes D1 or D2, diodes having a large current rating in parallel with all the modules 20 or 22 would be required.

Figure 7:
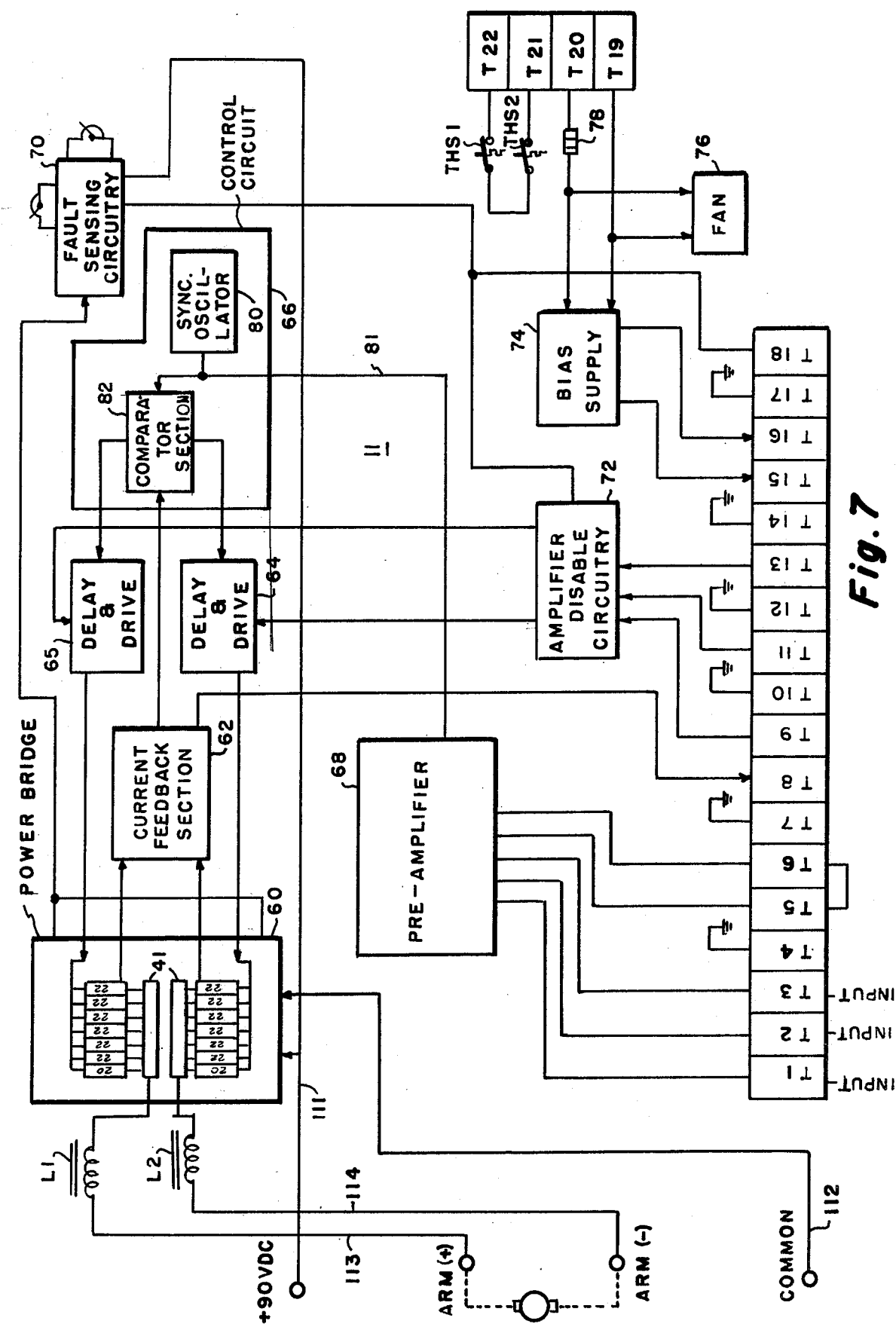
FIG. 7 is a view of a servo controller constructed according to the teaching of the present invention with the power output modules connected in a bridge configuration.

Referring now to FIG. 7, there is shown a more detailed block diagram of a servo controller 11 having the output of modules 20 or 22 connected in a bridge configuration. The servo controller 11 shown in FIG. 7 includes a power bridge output section 60, a current feedback section 62, delay and drive sections 64 and 65, a synchronization and comparator section 66, a preamplifier 68, output inductors L1 and L2, thermo switches THS1 and THS2, fault sensing section 70, amplifier disable circuitry 72, and a bias supply 74. Input terminals T1, T2 and T3 are also provided for making electrical connections to the servo controller 11. A fan 76 is provided for cooling the power semiconductors utilized in controller 11. A fuse 78 provides protection for the fan 76 and the bias supply circuit 74 of controller 11.

Preamplifier 68 which has input connections to terminals T1, T2 and T3 amplifies and combines various input signals including a tachometer feedback signal, for presentation to the power sections of controller 11. Preamplifier 68 filters and scales the various input signals and amplifies the combined error signal. Preamplifier 68 processes the combined error signal through a servo compensation network and also limits the maximum value of positive and negative voltage signals at its output so as to limit the ultimate current flow through the power output section and load. Preamplifier 68 has appropriate adjustment potentiometers to accomplish the desired compensation, voltage limiting, and scaling functions.

The synchronization and comparator section 66 includes a synchronization oscillator 80 and a comparator network 82. Oscillator 80 provides a synchronization signal in the form of a triangular wave shape. This triangular signal acts to modulate the signal obtained from the preamplifier section, along line 81, to form a third signal which is fed to comparator section 82. The combined signal fed along line 81 to comparator section 82 is combined algebraicly with the current feedback signal from current feedback sections 62. The total combined signal acts to modulate the switching point of comparator section 82. The output of comparator section 82 is fed to delay and driver sections 64 and 65. Section 66 supplies identical digital signals to delay and driver sections 64 and 65.

The output of delay and driver section 64 and 65 are in turn fed to the input of power bridge 60. Delay and driver sections 64 and 65 are supplied with identical digital signals from comparator 82. Delay and driver sections 64 and 65 are the same except for an additional inverter circuit at the input to delay and driver 65. The function of the inverter in delay and driver 65 is to supply a logic negative signal to that delay and driver section 65. The function of the delay and driver section is to delay by a controlled amount the positive, ON signal; but not delay the negative, OFF signal as these signals pass through associated delay and driver sections. In addition to ON delay sections 64 and 65 provide the required circuitry to provide the appropriately phased and amplified signals to the output bridge section 60.

The power bridge output section 60 comprises two output and driver modules 20 which are connected in a bridge output configuration. Up to seven output modules 22 can be connected in parallel with each output and driver module 20. Thus, each side of the power bridge 60 has one output and driver module 20 and up to seven output modules 22 connected in parallel. Current from the associated output circuits 20 flows through combining means 41 which comprises mechanical supports and current collectors 30, 31 and 32. The modules 22 or 20 are mounted to a mechanical structure, part of which consists of aluminum current collector rails 30, 31 and 32 which acts as the combining means 41 for the modules. The modules 20 and 22 are configured electrically and mounted mechanically so as to form a bridge or H output power section 60.

The bridge output connection has advantages over alternate type connections. The bridge output section has desirable features not possessed by the alternate bi-directional type of output section, the so-called single ended amplifier. For power transistors with the same voltage capability the bridge configuration provides twice the load voltage magnitude obtainable with a single ended amplifier. A disadvantage with the single ended switching type amplifier is that a voltage magnitude increase occurs in one of the two power supplied in the single ended amplifier when it provides a constant DC current to an inductive load. The voltage increases if not controlled, will eventually cause breakdown of the power transistors and/or associated components. The bridge type configuration prevents this voltage magnitude increase by providing for regenative feedback from the load.

The output from combining means 41 is processed through output inductors L1 and L2. These output inductors L1 and L2 have relatively small values, just being large enough in inductance to limit the rate of rise, di/dt, in the load circuit in the event of a short circuit to the common connection 112. The delayed current rise allows sufficient lag time for the over-current protection circuit to operate and disable the controller before significant damage occurs. This precaution prevents catostrophic failures due to short circuits across the load of from either output to ground or common.

Thermal switches THS1 and THS2 provide thermal protection for controller 11. These devices, THS1 and THS2, provide a contact opening signal in the event of an over-temperature condition. Fan 76 provides ambient air flow for cooling of the power semiconductors. If, for example, the cooling fan fails or the ambient temperature increases beyond a predetermined point, thermal switches THS1 and THS2 can disable servo controller 11. The sensor for each thermal switch is connected in associated output and driver modules 20. These modules 20 are mounted the furthest from the cooling fan 76 and hence should be the warmest. By providing thermal protection for these modules 20, the other output modules 22 are also protected.

Current feedback section 62 provides a current feedback signal to synchronization section 66. The current feedback signal provided by section 62 can be obtained from the power bridge section 60 by any of the methods described herein.

Amplifier disable circuitry 72 is also provided for disabling controller 11 due to a malfunction. Disable circuitry 72 disables the servo controller 11 in response to an externally applied signal from terminal T9, T11 or T13. Amplifier disable circuitry 72 is also connected to be activated by fault sensing circuitry 70. Fault sensing circuitry 70 is connected to power bridge 60 and supplies a disable signal to circuitry 72 upon the occurrence of an overload current flow through power bridge 60. Controller 11 current can be limited in either direction of motor rotation.

A bias supply 74 is provided to provide a low power bias supply that provides regulated positive and negative 15 volt DC for the low level controller circuit. The bias supply also supplies an unregulated positive 24 volts DC for part of the delay and driver circuit sections 64 and 65.

Figure 8A:
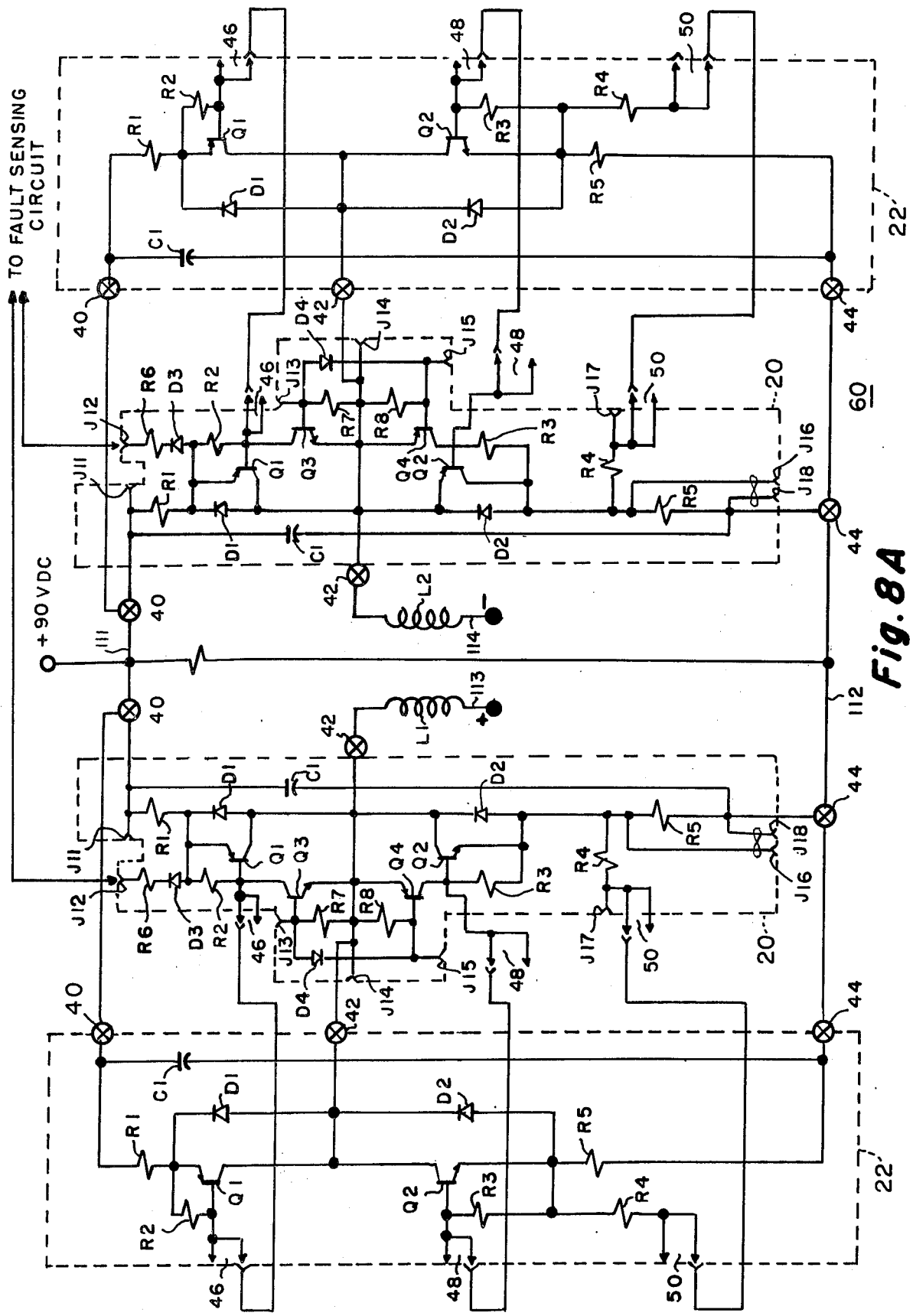
FIGS. 8A, 8B, 8C and 8D show a detailed circuit of a servo controller shown in FIG. 7 utilizing the teachings of the present invention.
Figure 8B:
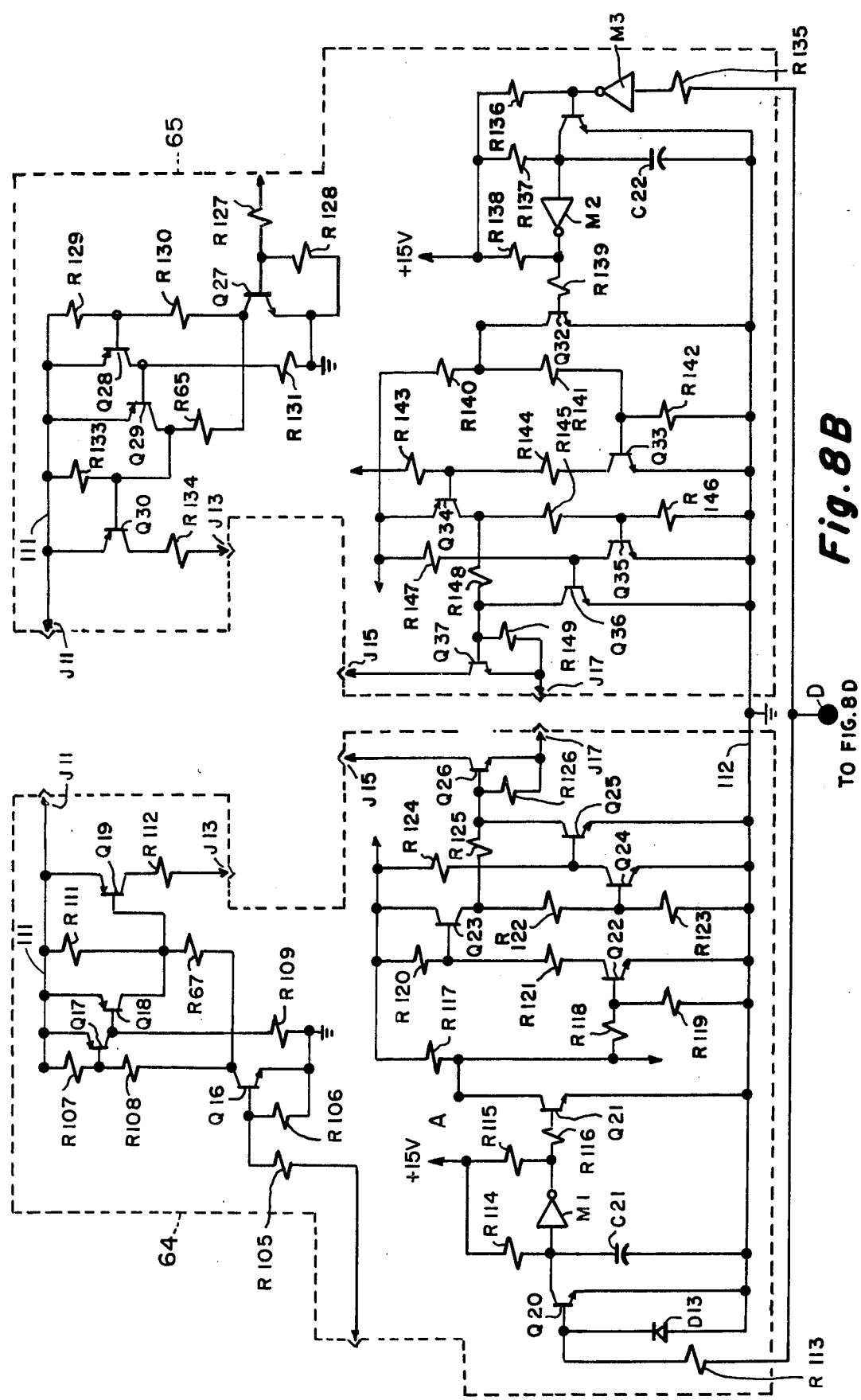

Referring now to FIGS. 8A, 8B, 8C and 8D there is shown a detailed schematic of a servo controller 11 utilizing the teaching of the present invention. FIG. 8A shows schematically two output and driver sections 22 connected in a power bridge configuration. Each output and driver section 22 has an output section 20 connected in parallel therewith. The output of these sections 20 and 22 are supplied through inductors L1 and L2 to outputs 113 and 114 which is connected to a load which is usually a DC type motor.

Figure 8C:
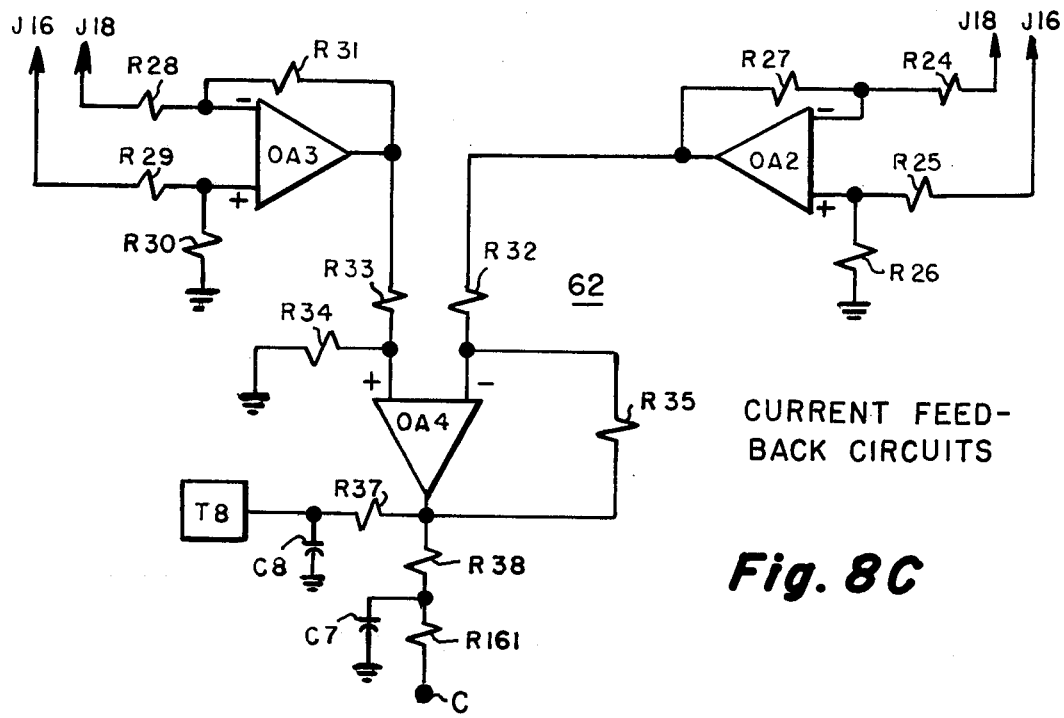

FIG. 8B shows schematically the connection of delay and drive sections 64 and 65 to power bridge 60. FIG. 8C details schematically the current feedback section 62. The function of circuit 62 is to differentially sample the current signal at each side of the bridge using operational amplifier OA3 for one side and operational amplifier OA2 for the other side. These signals are subsequently combined differentially in operational amplifier OA4. The double differential scheme eliminates common mode voltages from the current feedback signal which would otherwise distort the signal. Because of the differential combining the signal at C is a more accurate representation of the current flowing in the load circuit. The current sampling is accomplished in the two lower legs of the power output bridge 60 near common line 112, thus eliminating a great problem, caused by high common mode voltages, encountered by many prior art amplifiers, which sample current with a shunt disposed in series with the load.

Figure 8D:
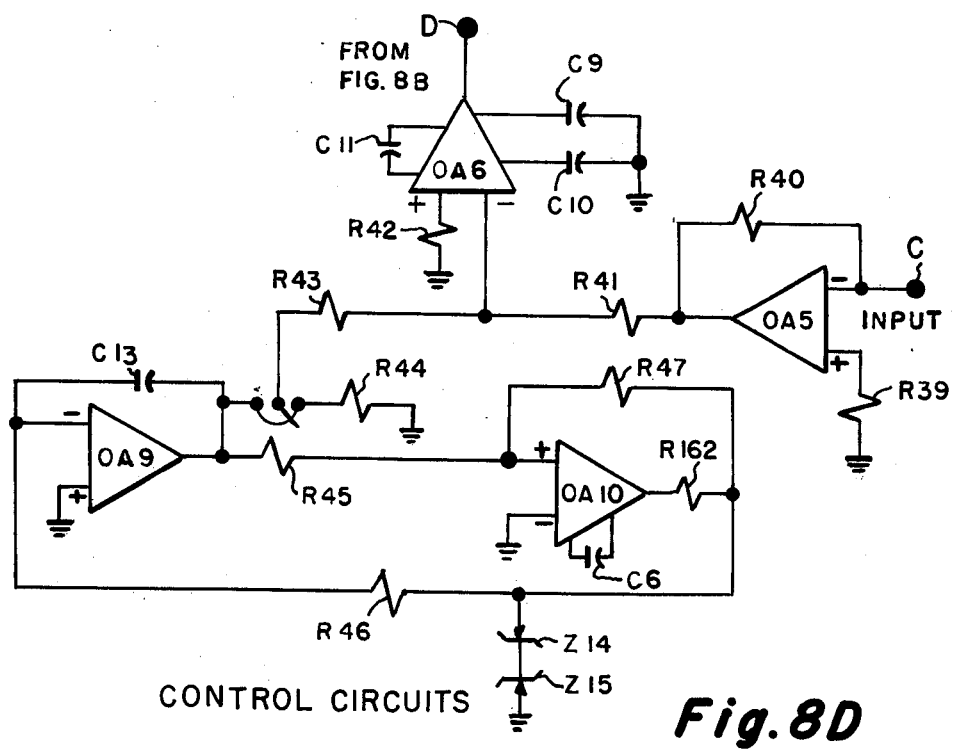

FIG. 8D shows schematically the control circuit section where current feedback and current command signals are first combined in operational amplifier OA5. The resultant signal is then combined with a synchronization signal from a triangular wave form generator, consisting of operational amplifier OA9, OA10, and the associated circuitry. The combined signal is fed to comparator OA6, the output of which is fed to each delay and driver section 64 and 65 for further processing.

The following are the component values used in a servo controller as shown in FIGS. 8A, 8C and 8D in accordance with the teaching of the present invention.

| | |
|---|---|
| R1 | .05Ω |
| R2, R3, R7, R8 | 47Ω |
| R4 | 5.1Ω |
| R5 | .1Ω |
| R6, R44, R106, R128, | 2K |
| R24, R25, R26, R27, R28, R29, R30, R31, R32, R33, R109, R116, R121, R131, R139, R144 | 10K |
| R34, R35 | 60.4K |
| R37 | 2.7K |
| R38, R39, R161 | 18K |
| R40 | 91K |
| R41, R42 | 39K |
| R45, R47 | 20K |
| R46 | 3.9K |
| R65 | 500Ω |
| R67 | 500Ω |
| R105, R127 | 510Ω |
| R43 | 82K |
| R108, R130 | 56K |
| R111, R126, R133, R149 | 200Ω |
| R112, R134 | .5Ω |
| R113 | 33K |
| R114, R136, R137 | 47K |
| R115, R119, R120, R123, R107, R129, R138, R142, R143, R146 | 5.1K |
| R117, R140 | 1.5K |
| R118, R141 | 4.3K |
| R122, R145 | 30K |
| R124, R135, R147 | 15K |
| R125, R148 | 220Ω |
| R162 | 390Ω |
| C1 | 30μf |
| C6, C11 | 3.3pf |
| C7 | 0.1μf |
| C8, C9, C10 | .1μf |
| C13 | .01μf |

-continued

| | |
|---|---|
| C21, C22 | .0022μf |
| OA6, OA10 | 748 |
| OA2, OA3, OA4, OA5, OA9 | 741 |
| M1, M2, M3 | 681 |
| D1, D2 | A115B |
| D4 | MR812 |
| D3 | IN4006 |
| D13 | IN4006 |
| Z14, Z15 | IN758 |

Figure 9:
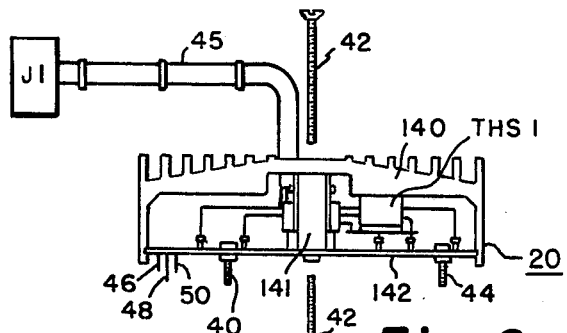
FIG. 9 shows a complete output power and driver module mounted to the associated heat sink.
Figure 10:
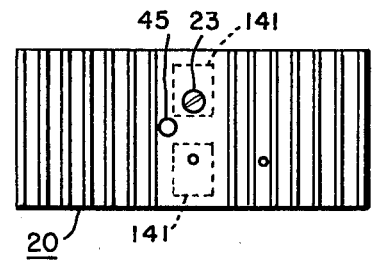
FIG. 10 is a top view of the output and driver module shown in FIG. 9.
Figure 11:
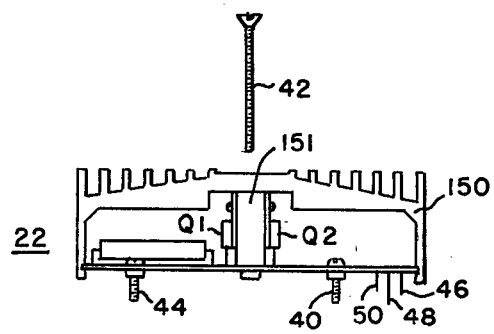
FIG. 11 shows a complete output module with the associated heat sink.
Figure 12:
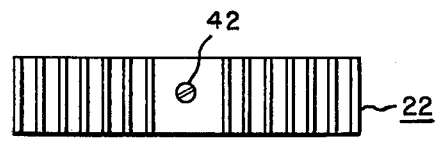
FIG. 12 is a top view of the output module shown in FIG. 11.

Referring now to FIGS. 9 and 10, there is shown an output and driver module 22 ready for mounting. Module 22 contains two intermediate heat sinks 141 and a final heat sink 140. The heat sinks 140 and 141 provide a good thermal path from the case of power transistors Q1, Q2 Q3 and Q4 to the ambient air which flows passed the finned portion of heat sink 140. Cooling fan 76 provides for an air flow passed the heat sinks 140 which comprise power output section 60. Output transistors Q1 and Q2, and driver transistor Q3 and Q4 are attached to intermediate heat sinks 141 which are connected in turn to the final heat sink 140 by bolts 42. Transistors Q1 and Q2 are attached to opposite sides of a heat sink block 141, while driver transistors Q3 and Q4 are attached to opposite sides of another heat sink block 141. Bolts 42 continue through printed circuit (PC) board 142 to form a stud for mounting to the rail 31 of the combining means 41. Bolt 42 also goes through the intermediate heat sink 141 which is drawn into good thermal contact with outer heat sink 140. Bolt 42 connects to current collector rail 31. A thermal switch THS1 is also connected to heat sink 140 for sensing over temperature conditions in output and driver module 22. Exiting from heat sink 140, at a location between the intermediate heat sinks 141, is a cable 45 which carries signals to and from the main printed circuit board. Module 22 also contains terminal studs 40 and 44 for making contact with the plus 90 volt power rail 30 and the common rail 32, respectively, of the combining structure 41. These studs also provide mechanical support for module 22. Terminal studs are inserted through printed circuit board 142 which provides interconnection between various component parts in the module 22. Resistor R1 is directly etched on printed circuit board 142. FIG. 10 is a top view of the output and driver module 22. Note that this module is double size compared to the output module 20 containing only the power output circuit. FIG. 11 shows a top view of a power output module 20. FIG. 12 shows a side view of power output module 20. Transistors Q1 and Q2 which are power output transistors are attached to intermediate heat sink 151 which is in turn attached to final heat sink 150 by output terminal bolt 42. Bolt 42 also serves as a terminal stud for attaching output modules 20 to the output rail 31 of the combining means 41. Terminal studs 40 and 44 and printed circuit board 142 serve the same purpose as described for FIG. 9 above.

Figure 13:
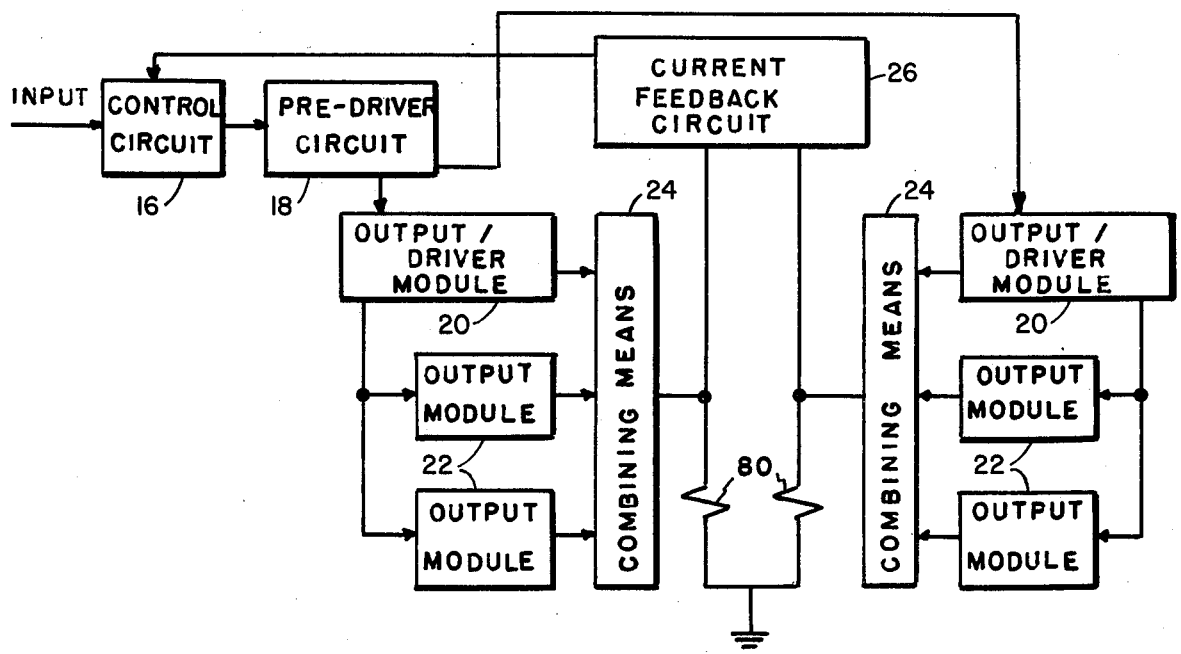
FIG. 13 is a block diagram of a servo controller connected with a bridge output showing a current feedback signal derived from shunt resistors in each leg of the bridge.

FIG. 13 shows a third embodiment for current sampling. A single high power sampling resistor 80 is employed on each side of the bridge to sample current. The resistors used for sampling in the other two embodiments must still be retained since they are used to force current sharing among the various modules.

What is claimed is:

1. A power processor comprising, input means for receiving inputs into the power processor; an output section for providing an output from the power processor which has a characteristic of the input; control circuit means disposed between said input means and said output section for controlling said output means; and, said output section comprises:
   a first plurality of parallel connected integral, detachable power output modules each comprising semiconductor components for supplying a proportional amount of the output power;
   protective circuitry means formed on each module for protecting some semiconductor components of said module from overvoltage during operation; and,
   output combining means electrically connected to said plurality of integral detachable power output modules for combining the output from said plurality of integral detachable power output modules and providing mechanical support for said plurality of integral detachable power output modules.

2. A power processor as claimed in claim 1 wherein:
   at least one of said first plurality of integral detachable power output modules comprises a driver section which drives some of the other of said first plurality of integral detachable power output modules.

3. A power processor as claimed in claim 1 wherein:
   each of said first plurality of parallel connected integral detachable power output modules includes an integral heat sink;
   said output combining means comprises two sets of spaced apart output combining rails defining an air space therebetween; and,
   each power output module is constructed to attach to one set of output combining rails with the integral heat sink projecting into the air space defined between said two sets of spaced apart output combining rails.

4. A power processor as claimed in claim 3 comprising:
   a fan disposed to move air through the space defined by said two sets of spaced apart output combining rails.

5. A power processor as claimed in claim 1 wherein:
   a second plurality of parallel connected integral, detachable power output modules each supplying a proportional amount of the output power;
   said output section is connected in a bridge configuration with said first plurality of output modules forming one side of the bridge and said second plurality of output modules forming the other side of the bridge configuration; and,
   each of said first and second plurality of integral detachable power output modules comprises solid state components defining one half of a bridge section.

6. A power processor as claimed in claim 5 comprising:
   current feedback means connected between said output section and said control circuit means for providing a current feedback signal representative of the output current of said power processor.

7. A power processor as claimed in claim 1 wherein:
   said output section is connected in a bridge configuration; and,
   each of said first plurality of integral detachable power output modules comprises a pair of complementary PNP/NPN transistors.

8. A power processor as claimed in claim 7 comprising:

a first load sharing resistor connected in series with the emitter of one of said pair of complementary PNP/NPN transistors; and, a second load sharing resistor connected in series with the emitter of the other transistor.

9. A power processor as claimed in claim 8 wherein: said first load sharing resistor is an etched copper resistor.

10. A power processor as claimed in claim 1 comprising:

load sharing means for causing load sharing among said plurality first of integral detachable power output modules; and, said load sharing means comprises a copper resistor having a positive temperature versus resistance coefficient.

11. A servo controller which supplies output power in response to an input signal comprising:

a plurality of output modules each supplying a proportional amount of output power and each including an integral finned heat sink;

each output module comprises integral protective circuitry for providing some protection for the associated output module;

output combining means to which said plurality of output modules are attached for combining the power output of said plurality of output modules comprising two sets of spaced apart combining rails defining a passage therebetween within which the integral finned heat sink of each of said plurality of output modules extends when mounted to a set of output combining rails; and a fan disposed to move air longitudinally along the passage defined by said two sets of spaced apart output combining rails.

12. A servo controller as claimed in claim 11 wherein: said plurality of output modules and said output combining means are connected in a bridge configuration with one set of said output combining rails representing one side of the bridge and the other set of said output combining rails representing the other side of the bridge.

13. A servo controller as claimed in claim 12 wherein: each of said plurality of output modules contains the components for one side of the bridge;

all the power output modules connected to one set of said output combining rails are connected in parallel; and, load sharing means disposed within each of said plurality of output modules for causing load sharing among the various output modules connected in parallel to the associated set of output combining rails.

14. A servo controller as claimed in claim 13 wherein: at least one of said plurality of output modules connected to each set of output combining rails includes a driver section for controller operation of all other output modules connected to the same set of output combining rails.

15. A servo controller as claimed in claim 14 wherein: each output module having a driver means associated therewith includes temperature sensing means connected thereto for disabling the servo controller when the associated power output module temperature exceeds a predetermined value.

16. A servo controller comprising, an input; and an output section providing an output representative of a signal applied to the input; a control circuit section connecting said input to said output section; feedback means feeding a signal back from said output section to said control section; wherein said output section comprises:

a plurality of spaced apart output current combining conducting rails which are elongated and parallel;

a plurality of output power modules electrically connected in parallel and each having an input connected to said control section and an output electrically connected to some of said plurality of output current combining rails and being mechanically supported from the electrical connections to said output current combining rails; and, each power output module comprises integral protective circuitry for aiding in preventing overvoltage damage to the module during operation of the servo controller.

17. A servo controller as claimed in claim 16 comprising:

load sharing means disposed on each output power module for causing each power module connected to said plurality of output current combining rails to supply a proportional amount of the output power supplied by said servo controller.

18. A servo controller as claimed in claim 17 wherein: said load sharing means comprises an etched copper resistor.

19. A servo controller as claimed in claim 16 comprising:

load sharing means disposed on each output power module for causing each power output module to supply a proportional amount of the output power; and, said load sharing means comprises a resistor having a positive temperature coefficient.

20. A servo controller as claimed in claim 19 wherein: each of said plurality of output power modules includes an integral heat sink.

21. A servo controller as claimed in claim 16 comprising:

temperature sensing means connected to one of said plurality of output power modules for sensing the temperature of the associated output power module and disabling the servo controller when the temperature of the associated power output module exceeding a predetermined over temperature value.

22. A power processor comprising:

an input for feeding a signal into the power processor;

a plurality of output power modules each connected to supply an output related to the signal into said input of the power processor;

each of said power modules comprises solid state components and protective circuitry which prevents overvoltage damage to some of said solid state components under various operation conditions;

output combining means for mechanically supporting said plurality of output power modules and electrically combining the output of said plurality of output power modules;

control circuit means connecting said input to each of said plurality of output power modules; and, load sharing means disposed in each output power module for causing each output power module to provide a proportional amount of output power from the power processor.

23. A power processor as claimed in claim 22 wherein:
  each of said plurality of output power modules includes a pair of output transistors;
  said protective circuitry comprises a diode connected around each of said pair of output transistors; and,
  one of said plurality of output power modules includes a pair of driver transistors for driving the pair of output transistors of that module and the pair of output transistors of all other modules connected to the output combining means.

24. A power processor as claimed in claim 23 wherein:
  each of said output power modules includes an integral heat sink; and,
  said output combining means comprises three horizontally extending vertically spaced apart current conducting rails to which each output power module connects.

25. A power processor as claimed in claim 23 comprising:
  a temperature sensing means connected to said output power module containing said driver transistors for disabling the power processor when the temperature of the associated module exceeds a predetermined over temperature value.

26. A power controller comprising:
  an input;
  a control circuit connected to said input and providing an output control signal;
  a first output power module connected to the output of said control circuit and having a plurality of output terminals;
  a plurality of longitudinally extending spaced apart output current collector conductors having the output terminals of said first power output module connected thereto and being adapted to receive and support a plurality of output modules; and,
  each power output module comprises protective circuitry for providing some protection for the associated power output module.

27. A power controller as claimed in claim 26 comprising:
  load sharing means disposed within said power controller for causing all power output modules connected to said plurality of longitudinally extending spaced apart rails to share a proportional amount of the output load current.

28. A power controller as claimed in claim 26 wherein:
  said first power output module includes a power output stage, and a driver stage driving said power output stage;
  a plurality of power output modules connected in parallel with said first power output module;
  electrical interconnecting means for connecting said driver stage to all parallel connected power output modules; and,
  all other power output modules include only a power output stage and being electrically driven from the driver stage of said first power output module.

29. A power controller as claimed in claim 28 wherein:
  said first power output module and all other power output modules include integral heat sinks.

30. A power controller as claimed in claim 26 comprising:
  temperature monitoring and control means connected to said first power output module for monitoring the temperature of said first power output module and disabling the servo controller when the temperature of said first power output module exceeds a predetermined over temperature value.

31. A solid state servo controller for providing an output signal which has characteristics of an input signal comprising:
  an input;
  a control circuit means connected to said input for controlling operation of the solid state servo controller;
  a plurality of easily removable power output modules each comprising at least one power output semiconductor and an integral finned heat sink each providing a portion of the output power from the solid state servo controllers and each further comprising protective circuit means for providing some protection for said at least one power output semiconductors; and,
  output combining means connected to the output of each easily removable power output module for combining the outputs therefrom.

32. A solid state servo controller as claimed in claim 31 comprising:
  load sharing means disposed in each power output module to cause all the power modules connected in parallel to supply a proportional amount of the output.

33. A solid state servo controller as claimed in claim 32 wherein:
  said output combining means comprises two sets of longitudinally extending collector rails each set, being horizontally spaced apart, comprising a plurality of vertically spaced apart collector rails, the two sets of collector rails defining a passage therebetween; and,
  each set of rails being constructed to receive a plurality of power output modules in parallel.

34. A solid state servo controller as claimed in claim 33 wherein:
  said output combining means and said plurality of easily removable output modules are connected in a bridge configuration with the power modules connected to one set of output collector rails forming one side of the bridge and the power modules connected to the other set of collector rails forming the other side of the bridge.

35. A solid state servo controller as claimed in claim 34 wherein:
  a fan is disposed to move air through the space defined between said two sets of longitudinally extending collector rails, across the finned portion of the integral heat sink formed with each power module.

36. A solid state servo controller as claimed in claim 35 wherein:
  the power module on each set of current collector rails, spaced the furthest from the fan includes a temperature sensor and control for monitoring the temperature of the selected module and disabling the servo controller upon a selected over temperature.

37. A solid state servo controller as claimed in claim 36 wherein:

a feedback control means feeds a signal from the output of only one module connected to each set of current collector rails to said control circuit.

38. A servo controller having an input section; an output section formed from a plurality of electrically parallel output modules and comprising output combining means for combining the outputs from said plurality of output modules; a control section connecting said input section to said output section; a feedback section for feeding a signal from said output section to said input section; wherein each output module comprises:
 a heat sink having a finned outer surface and a recessed innersurface;
 a flat printed board disposed across the recessed innersurface;
 an intermediate heat conductor disposed between said printed circuit board and the innersurface of said heat sink making good thermal contact with said heat sink and being electrically connected to said output combining means; and,
 a pair of power semiconductors mounted on opposite sides of said intermediate heat conductor.

39. A servo controller as claimed in claim 38 wherein said output combining means comprises:
 a supporting and output combining structure for combining the output of a plurality of parallel connected output modules; and wherein,
 each output module comprises a plurality of output terminals, extending through said flat printed circuit board, adapted for removable connection to said supporting and output combining structure.

40. A servo controller as claimed in claim 38 wherein:
 each power module has a plurality of output terminals; said output combining means, for combining the output of said plurality of power output modules, comprises a set of spaced apart rails being adapted to receive the output terminals of an output module; and,
 each set of rails adapted to receive a plurality of output modules.

41. A servo controller comprising:
 a control circuit having an input and an output;
 a predriver circuit connected to the output of said control circuit for amplifying the signal from said control circuit;
 a driver and output power module connected to the output of said predriver circuit and having a plurality of outputs;
 a plurality of power modules connected in parallel with said driver and output power module and each power module comprises integral protective circuitry for protecting some module components;
 current feedback means connecting said driver and output power module and said control circuit for feeding a signal representative of the current output from said driver and output power module to said control circuit; and,
 output combining means having said driver and output power module removably connected thereto with common electrical and mechanical connections for collecting the output of said driver and output power module and supporting mechanically said driver and output power module.

42. A servo controller as claimed in claim 41 comprising:
 a plurality of power modules each removably connected to said output combining means and each increasing the power output capacity of the servo controller by a fixed amount.

43. A servo controller as claimed in claim 42 wherein each power module comprises:
 integral heat sink means on which some of the electrical components of the power module are mounted.

44. A servo controller comprising:
 control circuit means;
 output combining means;
 a plurality of power output modules each comprising solid state components and having a plurality of electrical outputs which are electrically connected to said output combining means and mechanically supported from the electrical connections to said output combining means;
 each of said plurality of power output modules comprises protective circuitry means for protecting some of the module solid state components; and,
 feedback means feeding a signal relating to the output of said plurality of output modules to said control circuit means.

45. A servo controller as claimed in claim 44 wherein:
 each of said plurality of power output modules supplies a proportional amount of the power output of the servo controller; and,
 said feedback control means supplies a feedback signal derived from one of said plurality of power output modules.

46. A power controller comprising:
 a modular output section formed from a plurality of parallel connected power output modules each supplying a proportional amount of the output of the servo controller;
 protective circuitry means disposed on each power output module to inhibit overvoltage damage of the associated power output module; and, feedback control means connected to one of said plurality of output modules feeding a feedback signal representative of the current flow through any of the power output modules for controlling power output of the servo controller.

47. A power controller as claimed in claim 46 wherein:
 the temperature of the power output module to which the feedback control means is connected is also monitored for temperature protection of the servo controller.

48. A power controller comprising:
 a plurality of power output modules supplying the power output from said servo controller and each comprises a switching component which is switchable on or off;
 protective circuitry comprising a diode connected around said switching component for preventing damage to the power output module when the switching component is switched off;
 load sharing means disposed in each power module for providing relative load sharing by each power module;
 combining means electrically connected to the power output terminals of each power module combining the power output of all power modules and mechanically supporting the associated power modules from the electrical output terminals.

49. A servo controller as claimed in claim 48 wherein:
 each power module is mounted on an individual heat sink for dissipating heat from the circuit components.

50. A power controller as claimed in claim 48 wherein said load sharing means comprises:

a resistor having a positive temperature versus resistance characteristic.

51. A power controller as claimed in claim 50 wherein:

said resistor is a copper etched resistor.

52. A power controller comprising:

a modular power output stage having a plurality of individual parallel power output modules each of which includes integral protective circuitry; and, load sharing means disposed in each module for forcing load sharing among said plurality of individual parallel power output modules comprising a resistor having a positive temperature coefficient.

53. A power controller as claimed in claim 52 wherein:

said resistor is a copper etched resistor.

* * * * *

UNITED STATES PATENT AND TRADEMARK OFFICE
CERTIFICATE OF CORRECTION

PATENT NO. : 4,125,800
DATED : November 14, 1978
INVENTOR(S) : Donald H. Jones

It is certified that error appears in the above-identified patent and that said Letters Patent are hereby corrected as shown below:

Column 6, equation (3) after "$\frac{1}{H_{FE}}$", "0" should be deleted.

Column 6, line 64, "7" should be deleted and should be inserted to the right of the 2nd occurrence of the "=" sign at line 61.

Column 6, line 68, "[(1/R]" should read --[1/R]--.

Column 6, line 68, after "dR", "8" should be moved to the right of the equation and read "(8)".

Column 7, line 2, "$dI_L \simeq EI$" should read --$dI_L \simeq \Delta I$--.

Column 7, line 20, "$\frac{2T_R}{2 \text{ ambient temperature}}$" should read --$\frac{\delta T_R}{\delta \text{ ambient temperature}}$--.

Column 7, line 52, "transsi-" should read --transi--.

Column 9, line 10, "supplied" should read --supplies--.

Column 9, line 28, "of" should read --or--.

Column 10, line 37, after "8A", --8B-- should be added.

Claim 10, line 4, "plurality first" should read --first plurality--.

UNITED STATES PATENT AND TRADEMARK OFFICE
CERTIFICATE OF CORRECTION

PATENT NO. : 4,125,800
DATED : November 14, 1978
INVENTOR(S) : Donald H. Jones

It is certified that error appears in the above-identified patent and that said Letters Patent are hereby corrected as shown below:

Claim 14, line 4, "controller" should read --controlling--.

Claim 38, line 10, "innsersurface" should read --innersurface--.

Signed and Sealed this

Third Day of April 1979

[SEAL]

Attest:

RUTH C. MASON
Attesting Officer

DONALD W. BANNER
Commissioner of Patents and Trademarks